Patented May 25, 1926.

1,585,792

UNITED STATES PATENT OFFICE.

ERNST SCHLUMBERGER, OF BERLIN-LICHTERFELDE, GERMANY.

COMPOUND HAVING BACTERICIDAL AND FUNGICIDAL PROPERTIES AND PROCESS FOR MAKING THE SAME.

No Drawing. Application filed October 26, 1923. Serial No. 670,959.

This invention relates to a compound having bactericidal and fungicidal properties, and to a process for making the same. I have found that by treating certain vegetable extracts such as sulfite waste lye or tanning extract with a halogen or with substances developing halogen, products are obtained having strong bactericidal and fungicidal properties. Therefore such products may be advantageously used as disinfectants or preserving compounds. They are especially distinguished by the fact that they are almost wholly inodorous and non-poisonous for men and beasts, so that they can be employed without doing harm to the same.

In carrying into practice my invention for instance sulfite waste lye which is obtained in large quantities as a disagreeable by-product in the manufacture of cellulose from wood is treated with chlorine gas. A yellowish red precipitate is produced which after being separated from the remaining solution forms an excellent disinfectant. The product may be improved in its properties by subsequent treatment with oxidizing agents such for instance with a mixture of a chlorate and hydrochloric acid. Preferably the chlorination is conducted in such manner that products containing at least 10 per cent of chlorine are formed. Instead of treating the vegetable extracts with free chlorine gas I may add to the said extracts substances which combine to disengage chlorine and, which are commonly used for producing chlorine, such for instance as bleaching powder and hydrochloric acid. Bleaching powder may be added to the vegetable extract and then the required amount of hydrochloric acid may be introduced.

Examples.

1. 1000 kgrms. of concentrated sulfite waste liquor are diluted with 500 liters of water and treated with chlorine as long as this is readily absorbed. The separated yellowish red product is filtered off and dried. It forms a light yellow mass soluble in water and containing 25 to 28 per cent of chlorine.

2. Sulfite waste liquor showing a specific gravity corresponding to 25° Bé. is treated with chlorine until the separated product of chlorination shows a percentage of about 22 per cent of chlorine. The precipitate is separated and suspended in watery hydrochloric acid containing 20 to 25 per cent of hydrochloric acid, to which an amount of potassium chlorate equal to one-fifth of the weight of the precipitate is added. The product is separated by filtering off and dried. It contains about 30 per cent of chlorine.

Similar products are obtained by treating with halogen or with substances developing halogen, tanning extracts, for instance quebracho extract instead of sulfite waste lye.

The solution of a substance obtained in this way shows in dilutions of 1:100 and 1:1000 a disinfecting power which is at first equivalent, but for long time is superior in intensity to that of carbolic acid. Owing to the inodorousness and harmlessness of the products their adaptability for different purposes is far superior to that of carbolic acid and comprises all form of disinfection. They are also adapted for the disinfection of seed-grain, for preserving wood, vegetable or animal fibres, hairs, feathers and the like. Furthermore the products may be mixed with ointments and soaps, or powders for strewing on wounds and compresses may be prepared by mixing the distinfectants with bandages or inert substances such as clay, bolus and the like.

In some cases it may be advisable to modify the disinfecting or sanitive power of the compounds by mixing them with other disinfecting or the like agents. The efficiency of the disinfecting solutions depends on their acidity, inasmuch as the action is somewhat weaker in alkaline than in acid solution. By presence of neutral salts the action of the disinfectants made according to the present invention is increased.

I claim:—

1. As a new article of manufacture and trade, a disinfectant obtained by treating sulfite waste lye with chlorine and separating the precipitate thus obtained.

2. As a new article of manufacture and trade a disinfectant obtained by treating sulfite waste lye with chlorine, a chlorate and hydrochloric acid and separating the precipitate thus obtained.

In testimony whereof I affix my signature.

ERNST SCHLUMBERGER.